United States Patent [19]
King

[11] Patent Number: 6,032,401
[45] Date of Patent: Mar. 7, 2000

[54] FISHING LURE

[76] Inventor: Franklin Henry King, P. O. Box 8303, Coburg, Oreg. 97408

[21] Appl. No.: 08/975,134

[22] Filed: Nov. 20, 1997

[51] Int. Cl.[7] ............................ A01K 85/12; A01K 85/14
[52] U.S. Cl. .......................................... 43/42.51; 43/42.46
[58] Field of Search ............................... 43/42.06, 42.22, 43/42.32, 42.46, 42.47, 42.49, 42.51, 44.83, 42.5, 42.52, 42.53

[56] References Cited

U.S. PATENT DOCUMENTS

| | | | |
|---|---|---|---|
| D. 152,526 | 2/1949 | Geiser . | |
| D. 538,169 | 4/1895 | Kelley . | |
| 962,237 | 6/1910 | Murry . | |
| 1,694,195 | 12/1928 | Watts . | |
| 2,750,703 | 6/1956 | Puste | 43/42.21 |
| 2,819,553 | 1/1958 | Fultz | 43/42.12 |
| 3,197,911 | 8/1965 | Rolfsness et al. | 43/44.2 |
| 3,412,500 | 11/1968 | Lahtinen | 43/41 |
| 3,529,376 | 9/1970 | Parmeson | 43/42.06 |
| 3,815,275 | 6/1974 | Amundson | 43/42.22 |
| 4,038,774 | 8/1977 | Misiak | 43/42.09 |
| 4,856,223 | 8/1989 | Evans | 43/42 |
| 4,962,609 | 10/1990 | Walker | 43/42.06 |
| 5,003,723 | 4/1991 | Dutcher et al. | 43/42.13 |
| 5,276,993 | 1/1994 | Rosenblatt | 43/42.06 |
| 5,414,952 | 5/1995 | McLaughlin | 43/42.5 |
| 5,588,246 | 12/1996 | Hill | 43/42.06 |

FOREIGN PATENT DOCUMENTS

| | | | |
|---|---|---|---|
| 1435049 | 3/1966 | France | 43/42.49 |

*Primary Examiner*—Jack W. Lavinder

[57] ABSTRACT

A fishing lure main body is formed from sheet metal stock with projecting tabs which, during manufacture, receive a fitting for line attachment. The tabs have inclined segments on which water acts to impart rotation to the lure. A plate on the fitting simulates the head of a bait fish. Absorbent members are adhesively attached to the sides of the main body and receive scented material. A supply of substitute absorbent members are adhesively carried on a release sheet for subsequent placement on the main body of the lure.

5 Claims, 1 Drawing Sheet

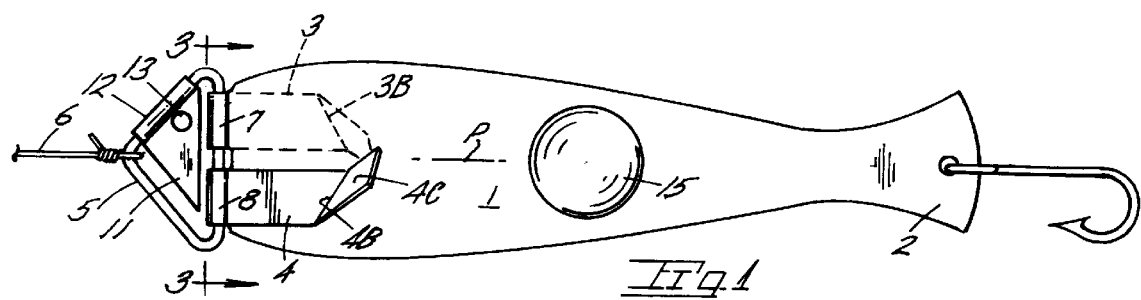
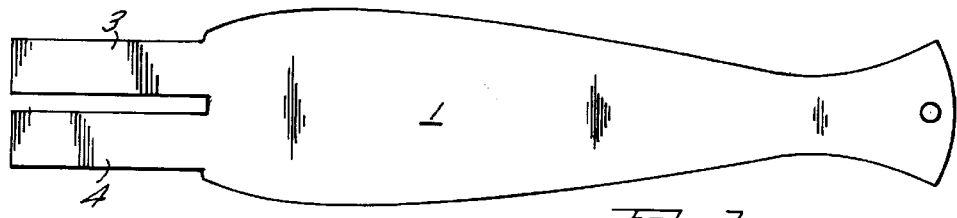
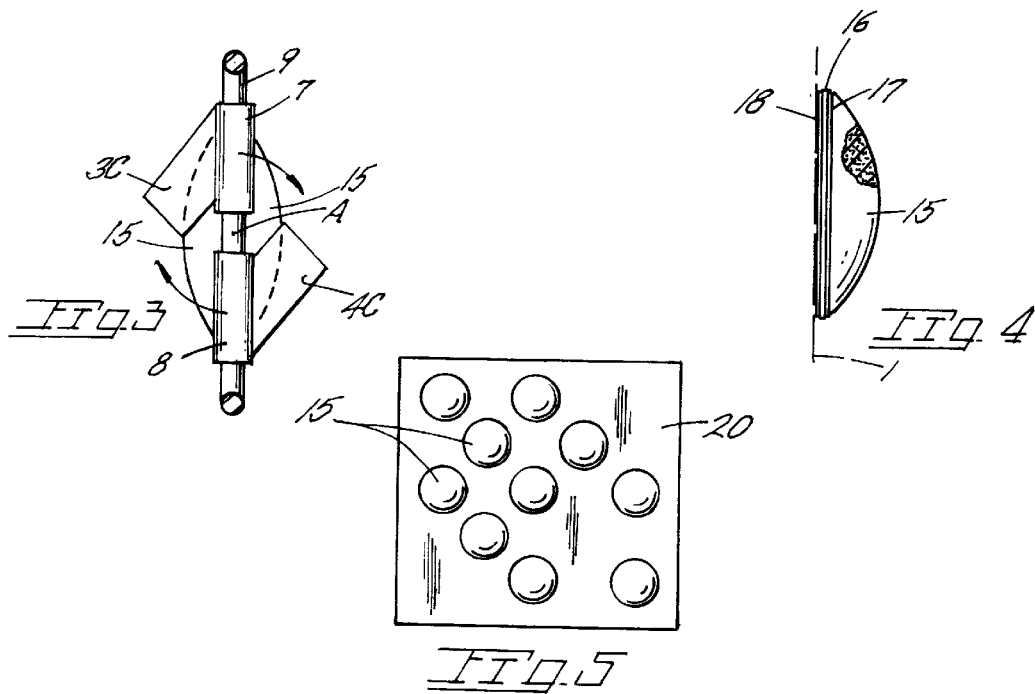

FISHING LURE

BACKGROUND OF THE INVENTION

The present invention pertains generally to fishing lures and particularly those having an action simulating a live bait.

A class of lures is directed toward simulating the action of a minnow or other live bait to attract a fish. Additionally it is common practice to provide a lure with a finish which reflects light also further simulating a minnow or other bait. Fins or other appendages on lures serve to impart a rolling action to a lure as it moves through the water to enhance lure attractiveness.

U.S. Design Pat. No. 152,526 discloses a lure body having simulated fins on opposite sides to impart rotation to the lure during movement through the water.

U.S. Design Pat. No. 538,169 also discloses a lure with a forwardly mounted blade terminating in oppositely inclined segments to impart rotation to the lure body.

U.S. Pat. No. 962,237 discloses a lure also provided with oppositely inclined simulated fins to impart desired movement to the lure about its longitudinal axis.

U.S. Pat. No. 2,750,703 additionally discloses a lure having a forwardly mounted blade structure imparting rotation to the lure about its axis.

U.S. Pat. No. 3,197,911 discloses a formed appendage for placement ahead of a live bait attachment and having curved surfaces for reaction to water to impart desired movement to the associated bait.

U.S. Pat. No. 4,038,774 shows a lure or plug, the forward end of which is provided with a shaped metal fin structure with upwardly and downwardly directed fin segments imparting rotation to the lure about its lengwise axis.

U.S. Pat. No. 5,588,246 discloses a lure wherein simulated eyes of the lure include spongy material which may be treated with fish-alluring scents. The spongy material may be removed upon partial disassembly of the lure body.

U.S. Pat. No. 5,276,993 discloses a fishing lure having a main body of sponge material which is provided with a fish attractant during manufacture of the material.

U.S. Pat. No. 4,856,223 discloses a plastic worm type of lure provided with a flexible foam strip at 14 which is receptive to being treated with a fish attractant.

U.S. Pat. No. 4,962,609 discloses a fishing lure having a layer of closely knot fibrous material bonded to a backing sheet in turn bonded to the surface defining a recess in the lure body. The fibrous material absorbs a fish attractant.

SUMMARY OF THE PRESENT INVENTION

The present invention is embodied in a lure having an elongate body with lengthwise orientated tabs each terminating in oppositely directed end segments providing a fish attracting action to the lure which may be additionally enhanced by scent receiving absorbant members.

A main body of the present lure may be formed from metal which lends itself to finishing resulting in a highly reflective surface. During lure manufacture endwise extending tabs are formed which are subsequently shaped to provide end segments on which water acts to impart movement to the lure about the lengthwise axis of the main body. Additionally the tabs may be utilized to provide a hinged connection with a triangularly shaped nose piece of the lure which additionally serves to further simulate live bait.

Surfaces of the main body are of planar configuration permitting the attachment of a scent bearing appendage in a permanent or replaceable manner. Such appendages permit selective application of various scents to the lure to best suit fishing conditions. A modified form of the absorbant appendages includes an adhesive surface thereon to permit storage of several apepndages on a carrier strip for temporary selective transfer to the lure.

Important objectives include the provision of a lure body having integral tabs which are shaped to impart rotation to the lure body as it moves through water; the provision of a lure body with tabs which enable attachment to a fitting which further contributes to the simulation of a small bait fish; the provision of a lure body to which may be applied absorbent members provided with a fish attracting scent; the provision of a lure body with detachably mounted absorbent members which may be stored separately and selectively applied to the lure body as by an adhesive to best suit existing fishing conditions; the provisions of a lure body that lends itself to a low cost cutting and forming operation for a low cost of manufacture with a bright or light reflecting finish.

BRIEF DESCRIPTION OF THE DRAWINGS

In the accompanying drawings:

FIG. 1 is a side elevational view of the present lure;

FIG. 2 is a side elevational view of the lure body cut from sheet stock during lure production;

FIG. 3 is a vertical sectional view taken along line 3—3 of FIG. 1;

FIG. 4 is a side elevational view of the absorbent member shown in FIG. 1; and

FIG. 5 is a plan view of a release sheet with absorbent members removably in place thereon.

DETAILED DESCRIPTION OF THE PREFERRED EMBODIMENTS

With continuing attention to the drawings wherein applied reference numerals indicate parts similarly hereinafter identified, the reference numeral 1 indicates a main body of the present lure which is of elongate configuration preferably resembling a small fish of the type and size commonly used for game fish. Main body 1 may terminate in the tail 2 to further resemble a bait fish.

With joint attention to FIGS. 1 and 2, one end of the lure body is formed with axially projecting tabs 3 and 4 which may be accomplished in a die cutting operation during shaping of the main body and tail. Formation of the lure from sheet metal of the type which may be polished to a bright finish is highly desirable in that the lure may reflect light in the manner of a small fish or minnow. A triangular fitting at 5 includes three legs and may serve to attach the lure to a leader or other rigging at 6. Such attachment is achieved by bending at 7 and 8 of the tabs 3 and 4 about a leg segment 9 of fitting 5 as best shown in FIG. 1 during construction of the present lure. Subsequent to such attachment and bending of the tabs they will lie against opposite sides of the main body in juxtaposition therewith. End segments at 3A and 4A of the tabs are bent at 3B and 4B outwardly away from main body 1 to provide surfaces at 3C and 4C inclined in opposite directions relative a horizontal plane P containing the axis A (FIG. 3) of main body 1.

Main body 1 is preferably formed from a bright sheet metal such as brass or a plated metal with a high degree of light reflection.

Appearance of the lure simulating a small bait fish is contributed to by the placement of a plate 11 on fitting 5 as by a sleeve 12 integral with the plate. An eye is at 13.

In FIG. 4, an absorbent member at 15 is provided with adhesive means which may include a double sided adhesive bearing disk 16 with adhesive surfaces 17 and 18. Such an arrangement permits convenient application of member 15 to the planar sides of main body 1, as well as removal therefrom, enabling the installation of a substitute absorbent member with different fish attracting scents. For convenience sake, the substitute members may be carried on a carrier or release sheet 20 with like or different scents for selective application to the lure by the fisherman. Polyurethane open cell sponge material may be utilized for absorbent member 15 which may be of dome configuration, as shown, and applied to both sides of main body 1 as shown in FIG. 3.

In use of the lure it may be pulled or trolled continuously through the water for use as a reflective flasher located ahead of a bait or lure. Alternatively, it may be cast and retrieved at intervals to simulate a minnow. The lure may be used for ice fishing where it is repleatedly lifted and lowered for lure rotation in opposite directions. On lifting of the lure during ice fishing, the lure spins and flashes while when lowered the lure darts and gyrates in a fluttering manner and continues to flash to simulate an injured minnow all being highly attractive to a fish. The same lure action is realized during intermittent retrieval of the lure with rapid spinning followed by periods of downward fluttering and gyrating motions all the time flashing reflected light.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A fishing lure comprising, a main body of elongate shape having a lengthwise extending major axis, tabs integral with one end of said main body, each of said tabs oppositely disposed from said main body and each terminating in an end segment extending outwardly away from said main body, a line attachment fitting having multiple legs, one of said legs in hinged engagement with said tabs for attachment of the main body to a fishing line, and the end segment of each tab serving to impart rotational movement of the main body about its major axis during lure movement through water.

2. The lure claimed in claim 1 wherein said fitting is of triangular shape and includes a plate simulating the head of a bait fish.

3. The lure claimed in claim 1 additionally including an absorbent member affixed to said main body for reception of a scent producing substance.

4. The lure claimed in claim 3 wherein said absorbent body includes an adhesive member for removable attachment to the main body.

5. A fishing lure comprising, a main body of sheet metal and of elongate planar shape having a major axis and tabs integral with one end of said body, a fitting for fish line attachment carried by said tabs, each of said tabs bent rearwardly to lie against the main body, each tab having an end segment, said end segment of each of said tabs projecting away from said main body.

* * * * *